(12) United States Patent
Goodrum et al.

(10) Patent No.: US 7,607,030 B2
(45) Date of Patent: Oct. 20, 2009

(54) METHOD AND APPARATUS FOR ADJUSTING POWER CONSUMPTION DURING SERVER INITIAL SYSTEM POWER PERFORMANCE STATE

(75) Inventors: Alan L. Goodrum, Houston, TX (US); Roger E. Tipley, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 478 days.

(21) Appl. No.: 11/475,765

(22) Filed: Jun. 27, 2006

(65) Prior Publication Data

US 2007/0300084 A1    Dec. 27, 2007

(51) Int. Cl.
*G06F 1/00* (2006.01)
*G06F 1/32* (2006.01)
*G06F 15/173* (2006.01)

(52) U.S. Cl. .................. 713/300; 713/320; 709/226
(58) Field of Classification Search .............. 713/300
See application file for complete search history.

(56) References Cited

U.S. PATENT DOCUMENTS

| | | | |
|---|---|---|---|
| 5,446,852 A | 8/1995 | Hilpert et al. | |
| 5,621,343 A | 4/1997 | Yamauchi | |
| 6,442,700 B1 | 8/2002 | Cooper | |
| 6,711,691 B1 | 3/2004 | Howard et al. | |
| 6,775,787 B2 | 8/2004 | Greene | |
| 6,775,997 B2 | 8/2004 | Bash et al. | |
| 6,795,928 B2 | 9/2004 | Bradley et al. | |
| 6,904,534 B2 | 6/2005 | Koenen | |
| 7,032,119 B2 | 4/2006 | Fung | |
| 7,043,647 B2 | 5/2006 | Hansen et al. | |
| 7,058,826 B2 * | 6/2006 | Fung ..................... | 713/300 |
| 7,111,177 B1 | 9/2006 | Chauvel et al. | |
| 7,155,623 B2 | 12/2006 | Lefurgy et al. | |
| 7,272,517 B1 | 9/2007 | Brey et al. | |
| 7,421,601 B2 * | 9/2008 | Bose et al. ............. | 713/320 |
| 7,467,306 B2 * | 12/2008 | Cartes et al. ........... | 713/300 |
| 2002/0188877 A1 | 12/2002 | Buch | |
| 2003/0009705 A1 | 1/2003 | Thelander et al. | |
| 2003/0055969 A1 * | 3/2003 | Begun et al. ........... | 709/226 |
| 2005/0268189 A1 | 12/2005 | Soltis, Jr. | |
| 2006/0168461 A1 | 7/2006 | Allen | |
| 2006/0230299 A1 | 10/2006 | Zaretsky et al. | |
| 2006/0282685 A1 * | 12/2006 | Bahali et al. ........... | 713/300 |
| 2007/0067657 A1 | 3/2007 | Ranganathan et al. | |
| 2007/0283176 A1 | 12/2007 | Tobias et al. | |
| 2008/0242338 A1 * | 10/2008 | Yamamoto .............. | 455/522 |

OTHER PUBLICATIONS

Justin Moore et al., "Making Scheduling "Cool": Temperature-Aware Workload Placement in Data Centers," USENIX 2005 Annual Technical Conference, General Track, 16 pp.

(Continued)

*Primary Examiner*—Suresh K Suryawanshi

(57) ABSTRACT

A method for adjusting power consumption during server operation is disclosed. The method comprises initializing the server to a system power performance state (SPP-state) that comprises a plurality of constituent power settings, determining whether power regulation is required while the server is operating at the current SPP-state, setting a flag if power regulation is required, and increasing at least one of the plurality of constituent power settings associated with the SPP-state if the flag has been set.

19 Claims, 8 Drawing Sheets

OTHER PUBLICATIONS

Ratnesh K. Sharma et al., "Balance of Power: Dynamic Thermal Management for Internet Data Centers," Feb. 18, 2003, 14 pp.

Advanced Micro Devices, Inc., "Thermal Management & Server Density: Critical Issues for Today's Data Center," White Paper, Copyright 2004 Rackable Systems, 8 pp.

Intel Corporation, "Addressing Power and Thermal Challenges in the Datacenter," White Paper, Jan. 2005, 12 pp.

Mel Tsai, "Inside DSP on Low Power: Designing Low-Power Signal Processing Systems," Jun. 1, 2004, 10 pp.

Microsoft Corporation, "The Laptop Computer May Be Unable to Enter the C3 Processor Power-Saving State," Article ID 297045, Revision 2.2, Jan. 27, 2006, 3 pp.

Microsoft Corporation, "The processor never switches to the C3 power-saving state when you remove a USB floppy drive from a Toshiba Tecra 9000 portable computer," Article ID 315754, Revision 1.1, Sep. 27, 2005, 2 pp.

Chris Nuttall, "Intel set to unveil power saving processor," Aug. 14, 2005, 3 pp.

Samer Al-Khairi, "Power Management Features On The Embedded Ultra Low-Power Intel486 Processor," Copyright 2005 Intel Corporation, 5 pp.

Advanced Micro Devices, Inc., Acer Ferrari 4005 WLMi AMD Turion64 ML-37 Laptop Review, Copyright 2006 PCstats.com, 3 pp.

Helena Purgatorio, "Frequency switching improves power management in Power Architecture chips," Sep. 27, 2004, Updated Oct. 15, 2004, 3 pp.

Win Guides Network, "Increase the USB Polling Interval," last modified Oct. 30, 2002, 2 pp.

Enea Embedded Technology, "OSE Real-time Operating System to Support Freescale i.MX21 Applications Processor," Copyright 2006 Enea, 4 pp.

Goodrum et al., Office Action dated Jan. 29, 2009, U.S. Appl. No. 11/475,418, filed Jun. 27, 2006, 20 pp.

Goodrum et al., Office Action dated Dec. 29, 2008, U.S. Appl. No. 11/475,778, filed Jun. 27, 2006, 15 pp.

Goodrum et al., Office Action dated Jan. 16, 2009, U.S. Appl. No. 11/475,443, filed Jun. 27, 2006, 13 pp.

* cited by examiner

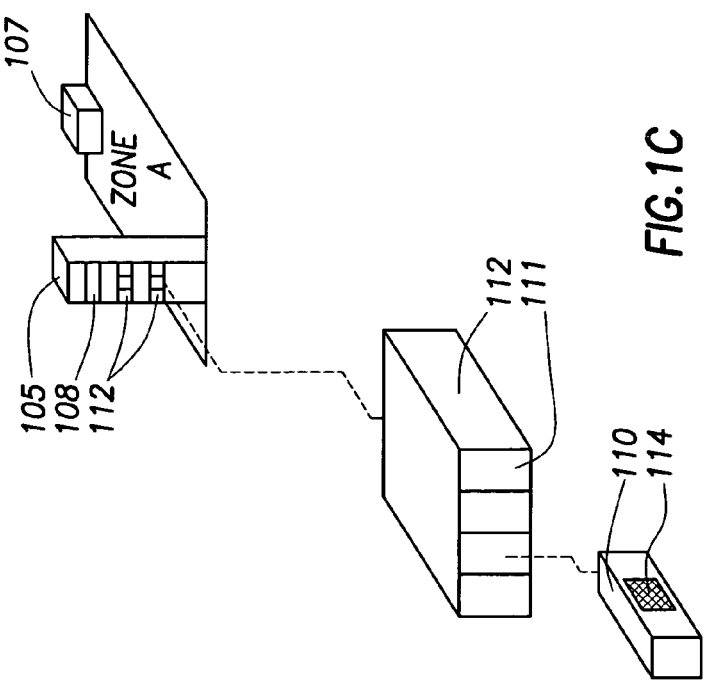
*FIG.1C*
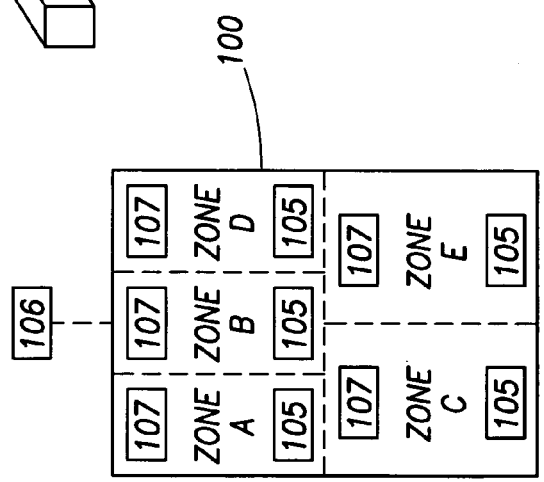
*FIG.1A*
*FIG.1B*

METHOD AND APPARATUS FOR ADJUSTING POWER CONSUMPTION DURING SERVER INITIAL SYSTEM POWER PERFORMANCE STATE

BACKGROUND

Computers are ubiquitous in society. For example, computers are present in everything from user-oriented desktop computer systems to complex networks of computers that facilitate credit card transactions. These complex networks represent a trend toward consolidating computers to implement high-density computing configurations, which are sometimes referred to as "data centers." In fact, it is not uncommon for these data centers to include tens of thousands of servers or more. To support of these data centers, information technology (IT) professionals have had to shoulder new burdens that were previously not of concern to IT professionals: power consumption and temperature maintenance.

Previously, data center facilities managers were primarily responsible for providing the specified power to the computers within the data center and were also responsible for maintaining the ambient air conditions to match the specified operating conditions of the computers within the data center. Typically, power and cooling requirements of the data center were estimated based on the "name plate" ratings—an estimate of the power and cooling requirements provided by the computer manufacturer. Historically, when computer server power levels were low, this approach proved practical. More recently, however, IT professionals have begun implementing servers as "blade servers" where each chassis is filled with multiple server modules, or "blades." Increasing the density of the servers in this manner may result in cooling costs for some data centers (e.g., 30,000 ft$^2$) running into the tens of millions of dollars per year and also may result in a higher incidence of undesirable service outages caused by cooling failures.

Some facilities and IT professionals have begun to "derate," or reduce the name plate power and cooling requirements by a fixed amount to increase the density of servers within a data center. De-rating, however, may still undesirably mis-predict actual power consumption. Other attempts to increase server density include estimating the actual power consumed with an anticipated application running on the server to provide a more accurate estimate of the actual power requirements of the server. However, an unexpected change in computing demand, for example as a result of a work load shift between servers, may increase power demand and trip a circuit breaker or cause localized over-heating.

BRIEF DESCRIPTION OF THE DRAWINGS

For a detailed description of exemplary embodiments of the invention, reference will now be made to the accompanying drawings in which:

FIG. 1A shows an exemplary data center;

FIGS. 1B and 1C show exemplary floor plans of a data center;

NOTATION AND NOMENCLATURE

Figure 2:
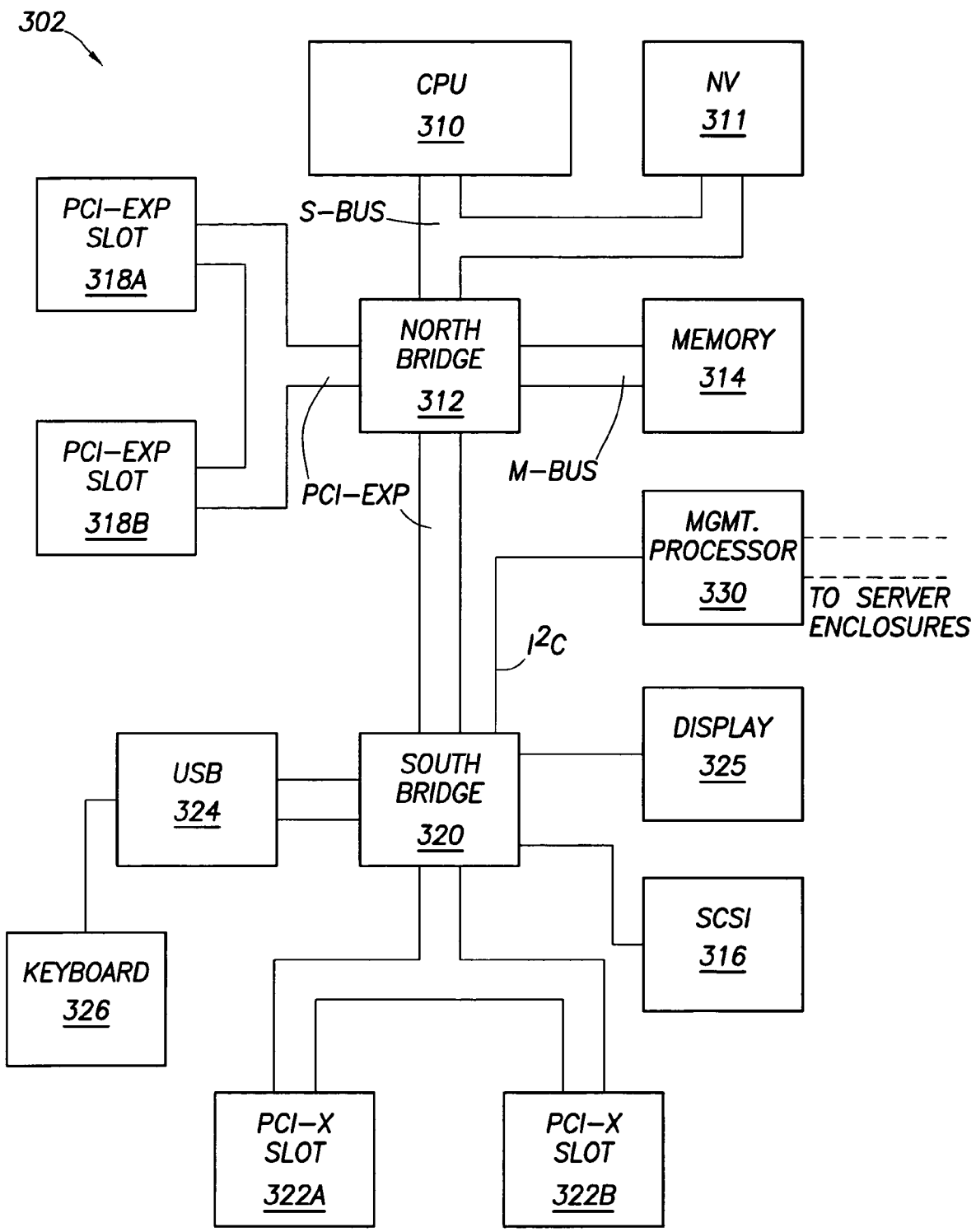
FIG. 2 shows an exemplary computer system.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect connection via other devices or connections.

The term "blade server" is intended to refer to a computer system with one of its dimensions, usually the width, substantially smaller than the rest. This is usually accomplished by integrating a majority of the server's components (including processor(s), memory, network cards, etc.) onto the motherboard, allowing multiple blade servers to be rack mounted within a common housing enclosure.

The term "management device" is intended to refer to any device that permits remote control functionality such as remote system configuration, remote power control, remote system reset, or remote operating system (OS) console of a host computer system.

The term "U" is intended to refer to a standard unit of measure for the vertical space that servers occupy within a server enclosure. Server enclosures such as racks and cabinet spaces as well as the equipment that fit into them are usually measured in U. 1U is equivalent to about 1.75 inches. Thus, a rack designated as 20U, is a server enclosure that has 20 rack spaces for equipment and housing enclosures and has 35 (20×1.75) inches of vertical usable space.

The term "power-regulation state," sometimes called "p-states," is intended to refer to varying levels of power consumption by the CPU, where each level or p-state indicates a different level of CPU functionality.

The term "data center" is intended to refer to a group of computers that perform a computing function. The computers from these data centers are often, but not always, housed in a common building and may include thousands of computers.

The term "clock modulation" is intended to refer to stopping the clock signal provided to some or all of the central processing unit (CPU) and/or other portions of a computer that may share this clock. Clock modulation is often achieved by asserting a STPCLK signal pin of the CPU or its support chipset.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Allocating Power within a Data Center

FIG. 1A depicts a data center 100 capable of housing numerous servers (not specifically shown in FIG. 1A). As alluded to in the Background, the thermodynamic limitations and energy availability of data center 100 may constrain the number of servers that may be implemented within data center 100. Power lines 102 provide power to data center 100 and this power is consumed by servers within the data center. As power is consumed by these servers, they generate heat. In order to keep the servers within their recommended operating temperature and prevent server failure, heating ventilation and air conditioning (HVAC) unit 104 removes heat generated as a result of server operation from data center 100. As is the case with most HVAC systems, even those that include elaborate water chilled cabinets, there are theoretical limits on the amount of heat that can be removed from the data center 100. These limits on the HVAC systems translate into limitations on the amount of power per square foot (i.e., power density) that may be consumed by servers within data center 100.

The current theoretical limit of allowable power density is believed to be about 1000 watts per square foot ($W/ft^2$) including the vacant aisle space between various server enclosures. This theoretical limit of 1000 $W/ft^2$ assumes that water chilled cabinets are used to house the servers, although some embodiments may implement cooling techniques that yield a higher theoretical limit. Thus, even if an elaborate cooling system is implemented, if a server rack and the unoccupied floor space around it take up 18 square feet ($ft^2$) of floor space, for example, then that rack is theoretically limited to 18,000 watts (W) of power. A typical 1U server may consume on the order of 620 W/server, and therefore, the maximum number of servers that may be implemented in this example is approximately 29, whereas a typical rack may be capable of physically accommodating forty-two 1U servers. Thus, despite having the floor space within data center 100 to add more servers to the rack, and the need to increase computing power by adding more servers to the rack, businesses may be limited from filling the racks to their full capacity.

The embodiments of the present invention may allow for this additional server capacity by budgeting the power allocated to "hypothetical" levels within the data center. These hypothetical levels represent user-defined entities that have different power consumption requirements. By actively managing the power consumed at each of these hypothetical levels, the total power consumed by the data center may be kept within a desired budget, thereby allowing more servers to be added to the data center.

FIGS. 1B and 1C illustrate floor plans of data center 100 according to an embodiment of the present invention. As illustrated in FIG. 1B, data center 100 may be divided into various zones (labeled A, B, C, D, and E) that include a plurality of racks 105. The data center 100 may have an overall power budget based on predefined building specifications, i.e., power cabling and/or HVAC design. A data center manager 106 may allocate this overall power budget among zones A-E, for example, according to the power cabling to a particular zone and/or HVAC capabilities of that particular zone. Regardless of the particular allocation method, data center manager 106 may allocate the overall power by negotiating with zone managers 107 that are located in each zone. In some embodiments, the data center manager 106 and zone manager 107 may be implemented in software, for example, by using the HP Systems Insight Manager (HP SIM) software available from Hewlett-Packard. This software may be executed on the devices illustrated within data center 100. For example, HP SIM may be used by a data center administrator to define hierarchical levels of abstraction for zones A-E within data center 100 as well as the processing features of data center manager 106 and zone managers 107.

One key feature of zone manager 107 is the ability to adaptively monitor and curtail the power consumption in a zone within the predetermined amount allocated to it by data center manager 106. For example, if zone manager 107 monitors physical conditions in zone A and determines that HVAC unit 104 cannot cool zone A—e.g., because the physical placement of racks 105 within zone A does not facilitate good airflow—then the zone manager 107 located in zone A may actively reduce the power budget assignment of racks 105 within zone A and report this information to data center manager 106.

In a recursive manner, racks 105 also may include a rack manager 108, which may be defined as another hierarchical level of abstraction within software such as HP SIM. Although rack manager 108 is depicted in FIG. 1C as housed in rack 105, in some embodiments, rack manager 108 may be a separate unit that is not housed in rack 105. Rack manager 108 may actively manage the amount of power consumed by server enclosures 112. In some embodiments, servers 110 may be implemented with "blade-type" servers, such as the HP ProLiant BL20p server available from Hewlett-Packard.

During operation, rack manager 108 may receive a power budget for its rack from zone manager 107. In turn, rack manager 108 may divide up this power budget among server enclosures 112. Likewise, each enclosure 112 may include an enclosure manager 111 that is capable of dividing the power budget for enclosure 112 among the plurality of servers 110 within enclosure 112. While enclosure manager 111 is shown housed in the same enclosure 112 as servers 110, other embodiments include housing enclosure manager 111 in other locations. In fact, in some embodiments, enclosure manager 111 may be implemented in software such as HP SIM.

Further still, each server 110 may include a management processor 114 that is capable of limiting the amount of power consumed by server 110 to be less than or equal to the dynamically assigned budget from enclosure manager 111. Thus, if zone manager 107 reduces the power budget of zone A, then one or more rack managers 108 may further reduce the power budget on one or more enclosure managers 111, which in turn may reduce the power budget for one or more management processors 114. Note that this adjustment by zone manager 107, rack managers 108, and/or enclosure managers 111 may occur independently and therefore a reduction in the power budget of zone A is not required prior to a reduction of the power budget of a particular rack within zone A.

In the end, management processor 114 may react to this reduction in power budget by limiting the amount of power available to individual components within server 110. Actions that may be taken by server 110 to curtail its power consumption within the budgeted amount include: slowing down server 110, off-loading work from server 110 and then shutting it down, not allowing server 110 to be powered up, or off-loading work such that the server spends more time in the idle state. For example, management processor 114 may move work load to a server that consumes less power or is in another zone. Equations 1-4 represent the mathematical expressions for the power budgets of the various levels of data center 100.

$$DataCenterBudget \geq ZoneA + ZoneB + \ldots + ZoneZ \quad \text{Eq. (1)}$$

$$ZoneA \geq RackA + RackB + \ldots + RackZ \quad \text{Eq. (2)}$$

$$RackA \geq \sum_{i=1}^{n} ServerEnclosure_i \quad \text{Eq. (3)}$$

$$ServerEnclosure \geq \sum_{i=1}^{n} server_i \quad \text{Eq. (4)}$$

Equation 1 illustrates that the sum of the power budgets of each zone is less than or equal to power budget assigned to the entire data center. Equation 2 demonstrates that the sum of the power budgets for each rack (e.g., Rack A through Rack Z) within zone A is less than or equal to the total assigned power budget for zone A. Equation 3 illustrates that the sum of the power budgets for each server enclosure within the rack is less than or equal to the total assigned power budget for a rack. Equation 4 demonstrates that the sum of the power budgets of each of the individual servers is less than or equal to the total assigned power budget for the server enclosure. Although four levels of power budget allocation and control are described in Equations 1-4, in practice, there may be multiple levels of power budget allocation and control (i.e., at least one at each hierarchical level).

Automatic Adjustment of Power Budgets within a Data Center

As was alluded to above, each server 110 may track (e.g., using management processor 114) its power budget assignment. In addition to tracking its power consumption, however, server 110 also may negotiate to adjust its power budget as its present needs change. This negotiation may occur between various components within data center 100, such as between data center manager 106 and zone managers 107. For example, data center manager 106 may direct zone manager 107 in zone B to use any excess power reported by zone manager 107 in zone A.

FIG. 2 depicts a block diagram of an exemplary computer server 302 capable of negotiating with other components within data center 100 and automatically adjusting its own power consumption to stay within the negotiated power budget. Server 302 includes a central processing unit (CPU) 310 that couples to a non-volatile storage device 311 and a bridge logic device 312 via a system bus (S-BUS).

Non volatile storage 311 is capable of storing executable code and data. The contents of non-volatile storage 311 may be changed from time to time by reprogramming either a portion or the entire non-volatile storage 311.

Bridge logic device 312 may be referred to as a "North bridge." In some embodiments, bridge 312 couples to a memory 314 by a memory bus (M-BUS). In other embodiments, however, CPU 310 includes an integrated memory controller, and memory 314 connects directly to CPU 310.

Bridge 312 also couples to PCI-Express® slots 318A-B using the PCI-Express® bus standard as disclosed in "PCI-Express Base Specification 1.0a," available from the PCI Special Interest Group (PCI-SIG) and incorporated herein by reference.

As noted above, server 302 may be implemented as a blade-type server that is part of a larger data center, such as data center 100. Regardless of the actual implementation of server 302, a management processor 330 may be included in server 302. Management processor 330 couples to the various portions of server 302 as well as coupling to power managers for server enclosures 108 as shown. In some embodiments, management processor 330 couples directly to North Bridge 312 via PCI or PCI-Express bus, and in other embodiments, management processor 330 couples to North Bridge 312 via a combination of a South Bridge 320 and a PCI-Express bus. Commercial implementations of management processor 330 include Hewlett-Packard's Integrated Lights Out (iLO) processor.

During operation, management processor 330 tracks the amount of power assigned to it by server enclosure 108 (shown if FIG. 1C) as well as the power consumption needs of server 302. One of ordinary skill in the art will recognize that of all the components in server 302, CPU 310 is one of the most power-hungry. Thus, in order to determine whether server 302 will benefit from either increasing or decreasing its power budget, management processor 330 monitors several key factors of CPU power consumption: CPU utilization and the CPU's power-regulation state.

CPU utilization refers to a measure of how much of a CPU's computing capacity is being used and indicates the overall activity level of a server. Fundamentally, CPU utilization may be thought of as the percentage of time that the CPU spends in a non-idle, active state. For example, a CPU that is 100% utilized is executing its maximum possible workload.

The CPU's power-regulation state, sometimes termed "p-states," refers to varying "states" or levels of power consumption by the CPU, where each level or p-state indicates a different level of CPU functionality. Since the CPU is made of numerous transistors that switch on and off to perform desired functions, and each time these transistors switch power is consumed, the faster the CPU operates the more power it will consume. Accordingly, the different p-states may be accomplished by adjusting the operating frequency of the CPU. (Note that altering the clock frequencies to achieve different p-states should not be confused with "clock modulation," which is described in more detail in subsequent sections of this disclosure.) In addition, to being proportional to the operating frequency the amount of power consumed by the CPU is also proportional to the square of the CPU's operating voltage. In other words, the lower the operating voltage, the lower the amount of power consumption. Therefore, different p-states may have different operating frequencies and different operating voltages.

For example, the P0 p-state is recognized as the highest level of performance (and highest possible level of power consumption) since the CPU runs at full operating frequency and full operating voltage in the P0 p-state. Thus, p-states lower than P0, which may be referred to as P1, P2, etc., will include either a lower operating frequency or a lower operating voltage or both. The precise value of the operating voltage and operating frequency for each p-state is determined by the CPU vendor to optimize CPU utilization while minimizing overall power consumption. Furthermore, each p-state has a target utilization, e.g., P0 may have a 100% utilization target while P1 may have a 70% utilization target. In accordance with some embodiments, each p-state may be associated with an upper threshold above this utilization and a lower threshold stored in non-volatile storage 311 and these thresholds may be used to adjust the p-state of the CPU as described in more detail below in the context of FIG. 3.

In any case, management devices, such as management processor 330 or enclosure manager 111, may use p-states to manage the power requirements of server 302. For example, assume that server 302 is in a p-state other than P0 and that CPU utilization is at or near 100%. Further, assume that according to embodiments of the present invention, server 302 is prevented from raising its p-state (e.g., from a lower p-state to the P0 p-state) because of an assignment from an entity further up in the hypothetical levels of data center 100, such as a power state assignment from a server enclosure manager 111. In this scenario where the CPU is 100% utilized and its p-state can be raised, server 302 could benefit from an increase in its power budget, and therefore may request that enclosure manager 111 increase its power budget. In a similar fashion, if CPU utilization drops so that the CPU would be less than 100% utilized in the next lower p-state, then server 302 may request that enclosure manager 111 reduce the power budget assigned to server 302, which in turn may request that rack manager 108 to reassign a power allocation.

This power budgeting process between the various levels of data center 100 continues in a recursive fashion. That is, as enclosure manager 111 receives requests for power from the various servers that it manages, if the total power requested by these servers exceeds the power budget set by rack manager 108 (i.e., the next level up in the hierarchy of data center 100), then enclosure manager 111 will request additional power from rack manager 108.

Since this negotiation process for more or less power budget varies with CPU utilization, and since CPU utilization is unknown prior to booting up server 302, a baseline power budget may be helpful. Accordingly, prior to powering on server 302, management processor 330 may be programmed with the name plate power requirements, and name plate power requirements may be used to power on and boot up server 302. After powering on server 302, however, the amount of power for operation may decrease, and therefore management processor 330 may reassess the power requirements of server 302 and adjust accordingly.

Figure 3:
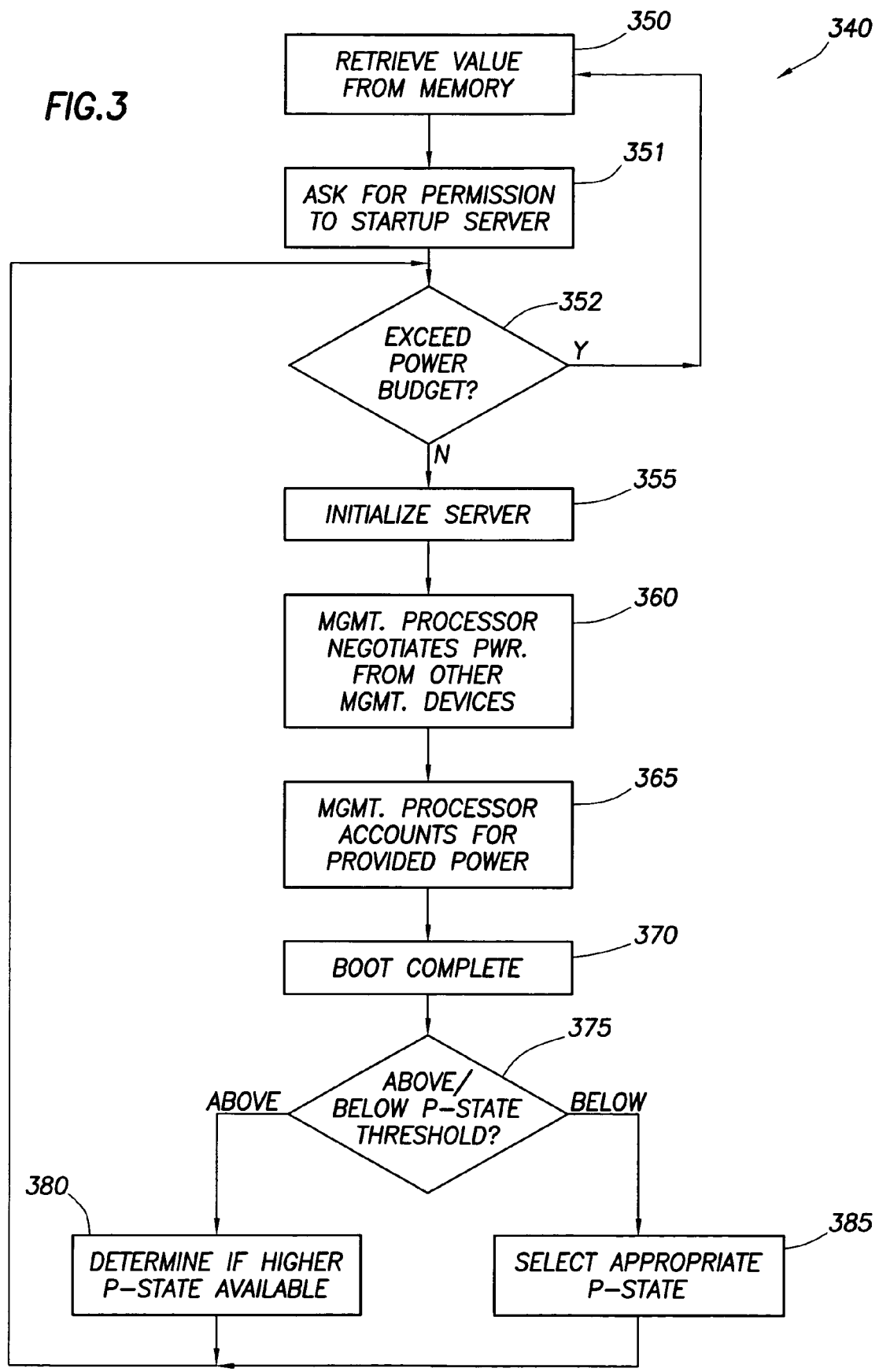
FIG. 3 shows an exemplary algorithm.

FIG. 3 depicts an algorithm 340 that may be implemented by management processor 330 to assess the power requirements of server 302 prior to, during, and after booting up. Beginning in block 350, the maximum power rating of server 302 may be retrieved from a memory location (such as non-volatile storage 311) by the management processor 330. In some embodiments, this maximum power rating is the name plate rating described above.

With the maximum power rating known, management processor 330 then asks permission from the enclosure manager 111 (or other managers higher up the hierarchical chain) to startup server 302 per block 351. The enclosure manager 111 then determines whether allowing server 302 to startup will cause the enclosure manager 111 to exceed its power budget in block 352. If allowing server 302 to startup will cause enclosure manager 111 to exceed its power budget, then algorithm 340 may loop back to block 350 and not allow server 302 to startup until either the power budget for enclosure manager 111 changes or the maximum power requirement for server 302 changes. On the other hand, if allowing server 302 to startup will not cause enclosure manager 111 to exceed its power budget, then server 302 is then initialized and a power-on self test (POST) may be performed in block 355. Note that during execution of blocks 350-355, management processor 330 is operational despite the fact that server 302 may not be operational.

During boot up, management processor 330 may renegotiate a power budget that is less than the name plate rating stored in memory, per block 360. In some embodiments, this negotiation may take place between management processor 360 and other management devices, such as enclosure manager 111 and zone manager 107. This negotiation process may include a scheme among servers that prioritizes the order that servers give power back to the overall power budget and also prioritizes the order that servers take power from the overall power budget. For example, some servers may be executing critical applications and therefore they may be given higher priority than servers executing non-critical applications. Further still, the negotiation process may include staging servers such that additional servers do not power on and begin negotiating a power budget until servers with a higher priority have completed booting up and have reached a stable power budget. This negotiation process also may be based on previous history (which may be stored in management processor 330) of servers that have given up and taken back power from the power budget in the past.

Once the negotiation is compete, in block 365, management processor 330 accounts for the power either provided to or taken from the total power budget. Management processor 330 may then report this accounting to enclosure manager 111, or other components higher up in hierarchy. Although the boot process may be complete (in block 370) and control may have been passed off to the operating system running on server 302, management processor 330 may dynamically reassess the power requirements of server 302 by looping through blocks 360 and 365 during server operation as is illustrated.

During server operation, management processor 330 may determine (in block 375) if the current CPU utilization is above or below the upper and lower utilization thresholds for the current p-state. This may occur, for example, by checking the contents of non-volatile storage 311. If the current CPU utilization is above the upper utilization threshold for the current p-state then management processor 330 may determine if there is a higher p-state available and may adjust the p-state of CPU 310 accordingly per block 380. At this point, management processor 330 may repeat algorithm 340, including block 365, to account for any power increases within the total power budget.

If, however, the current CPU utilization is below the utilization for a p-state, then in block 385, management processor 330 selects a p-state (which may be based on the thresholds stored in non-volatile storage 311) whose upper and lower utilization thresholds match the current server utilization. Effectively, if a lower p-state is chosen as a result of block 385 then CPU 310 is relinquishing at least some of the power allocated to it by management processor 330. Thus, according to block 360, management processor 330 may negotiate with other management devices (e.g., enclosure managers 111 or zone managers 107) to distribute the amount of power relinquished by CPU 310 among the other devices under the control of that particular management device. For example, if management processor 330 is negotiating with enclosure manager 111 then other servers within the same enclosure may receive the relinquished power, whereas if management processor 330 is negotiating with zone manager 107, then other servers within the same zone may receive the relinquished power.

In order to prevent the server that relinquished this power from having to renegotiate this power back if needed, some embodiments restrict management processor 330 to only negotiate with specific entities in the hypothetical chain, such as with other servers in the same enclosure manager 111. This may be particularly useful to prevent thrashing—i.e., where the server relinquishing power goes back and forth between periods of high activity (i.e., requires more power) to periods of low activity (i.e., requires less power).

In addition to reducing the power consumption of the server by reducing the power consumption of the CPU, other system components that rely on the number of requests from CPU (e.g., memory or disk drives) also may have their power reduced as a result of reducing the power consumption of the CPU. For example, during operation, the CPU makes disk access requests of the hard drive. Therefore, as the operating frequency of the CPU decreases because of lowering p-states, the number of disk access requests also may decrease, and hence, the hard disk may consume less power.

Power Budgets Based on Estimated Power Consumption

As mentioned previously, the name plate power may be used as a baseline power budget upon start up. Note that the name plate power is usually a general estimate for each model of server regardless of the server's configuration. In some embodiments, however, an estimated power consumption of server 302 may be used as a baseline power budget instead of the name plate rating. Such a feature may be useful in that servers may be configured differently (e.g., different number of hard drives) and a power estimate of the actual server being managed may represent a more accurate power budget to begin with.

In order to fully regulate the power consumption of the server, an additional factor that may be used to control CPU power consumption is the CPU's "clock modulation," which is a power control factor that is separate and apart from CPU p-state and CPU utilization. Clock modulation is where the clock frequency provided to some or all of the CPU is stopped for a period of time, which substantially reduces power consumption to the portions of the CPU that have their clock stopped. As is evident to one of ordinary skill in the art, the term "STPCLK" is an industry standard term for the CPU clock modulation control signal.

In some embodiments, the CPU may include a crystal oscillator that provides a base frequency to the CPU, and this base frequency may be increased (possibly by an internal phase locked loop) and then provided to other blocks within the CPU. In these embodiments, clock modulation may include stopping the clock frequency at the crystal oscillator, stopping the clock frequency at the phase locked loop, or both. Regardless of the actual internal clock distribution within the CPU, the CPU itself may include a STPCLK connection such that when STPCLK is asserted some or all of the internal CPU clock is stopped. Note that the functionality of STPCLK may be either active high or active low, and therefore, "asserting" STPCLK may include coupling a low signal to the STPCLK connection in some embodiments and in other embodiments it may include coupling a high signal to the STPCLK connection. By controlling the duty cycle, or percentage of time that a signal coupled to the STPCLK connection is asserted, power regulation may be achieved through clock modulation.

This clock modulation, in addition to other server settings may be used to regulate the power budget, where these settings collectively are referred to herein as Server Power Performance States or "SPP-states." That is, SPP-states represent a combination of settings within a server to effectuate a predetermined amount of power consumption. The constituent SPP-state settings include, but are not limited to, CPU p-states, CPU clock modulation or STPCLK settings, as well as various configurations for the server's subsystem components (e.g., the speed at which a hard disk drive rotates).

The SPP-state settings for a particular server may be determined prior to deployment and stored in non-volatile storage 311 so that the appropriate STPCLK, p-state, and subsystem settings can be made that limit power consumption within the power budget set by the enclosure manager. For example, server 302 may be outfitted with various available options such as different hard drive types and sizes, memory types and sizes, network cards, and power supplies. In order to measure power consumption for each of these unique hardware combinations, maximum computational work loads may be run on the server. These maximum workload tests are deliberately chosen to force server 302 to consume as much power as possible. For example, specific software code that activates some of the more power hungry portions of CPU 310, like the floating point unit or arithmetic logic unit, may be run on server 302. During this maximum workload test, the SPP-state settings that result in different power consumption levels also may be determined. These SPP-state settings that effectuate different power levels are then stored and this information is made available to hardware or software on server 302.

Referring again to FIG. 2, management processor 330 may store values representing the SPP-state settings for server 302 (based on its unique configuration) during a maximum work load. While server 302 operates, the SPP-state settings calculated to keep server 302 within the budgeted power may be selected by setting server 302 to implement actual power levels stored in management processor 330 rather than name plate power levels. Since the power level achieved using the measured p-state and clock modulation settings reflects the actual power rather than name plate power, the overall power budget for the data center may be allocated more efficiently.

Figure 4A:
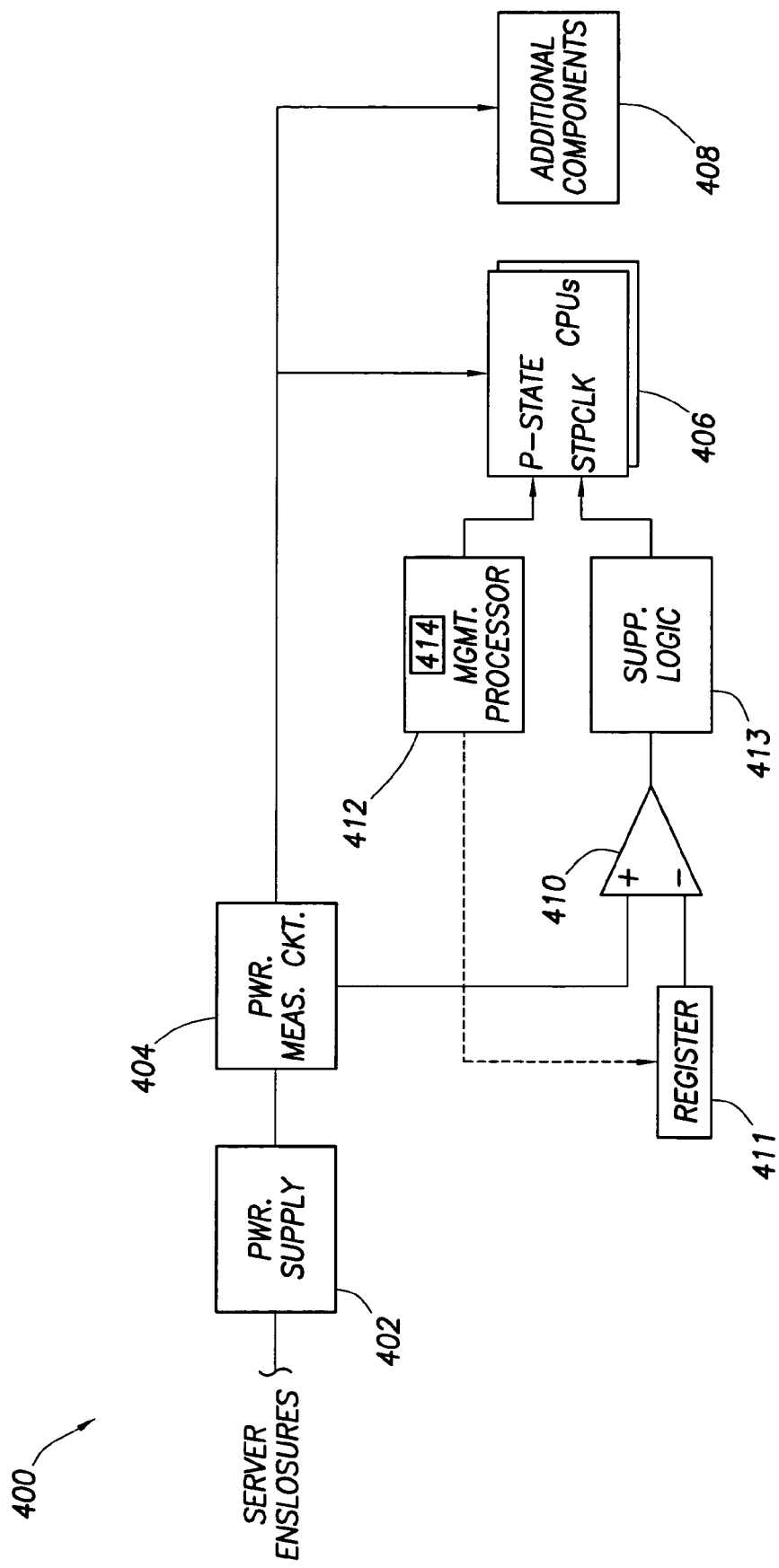
FIG. 4A shows an exemplary server.

FIG. 4A depicts a block diagram of an exemplary server 400 capable of adjusting its power consumption to within the power budget using SPP-state settings that reflect the unique power consumption requirements of server 400. Server 400 includes a power supply 402 that interfaces server 400 with the power delivery system of a server enclosure. Although it is shown as part of server 400, power supply 402 may physically reside in other areas of the data center in some embodiments.

Power supply 402 further couples to a power measurement circuit 404. Power measurement circuit 404 measures the power consumption of server 400, which may include CPUs 406 and additional system components 408 (e.g., memory or hard drives). A comparison circuit 410 couples to power measurement circuit 404 as well as coupling to a register 411. Register 411 may include a power budget value from a management processor 412 (indicated by the dashed line in FIG. 4A) or some other management device. For example, the power budget stored in register 411 also may be given to it by an enclosure manager 111, or rack manager 108.

The power measurement from measurement circuit 404 is fed to comparison circuit 410 and therefore may be referred to as a closed-loop approach. In other embodiments that may be referred to as a more open-loop approach, comparison circuit 410 may receive a power estimate based on predetermined lab characterizations instead of real time measurements. In yet other embodiments, a hybrid approach may be used where comparison circuit 410 uses the lab characterization at first to start server 400, and then builds a lookup table 414 with the power measurement values from measurement circuitry 404 as server 400 operates and then uses this instead of the lab characterization data.

Regardless of the source of the power consumption, comparison circuit 410 may compare this power consumption to the power budget stored in register 411 and couple the result of this comparison to support logic 413. In turn, support logic 413 may control a STPCLK signal that is fed to the one or more CPUs 406 to stop at least some of the clock signals within CPUs 406. For example, if the power consumption of server 400 is much greater than the power budget value stored in register 411, then STPCLK may have a relatively high duty cycle so that the amount of power consumed by CPUs 406 is reduced. Likewise, if the power consumption is less than or equal to the value stored in register 411, then STPCLK may have a relatively low duty cycle (e.g., 0% stopped) so that the amount of power consumed by CPUs 406 is not restrained by STPCLK. In addition to comparison circuit 410, management processor 412 may adjust other portions of the SPP-state, such as the p-states of CPUs 406 or the parameters related to the additional system components 408 (e.g., hard drive rotation speed).

Figure 4B:
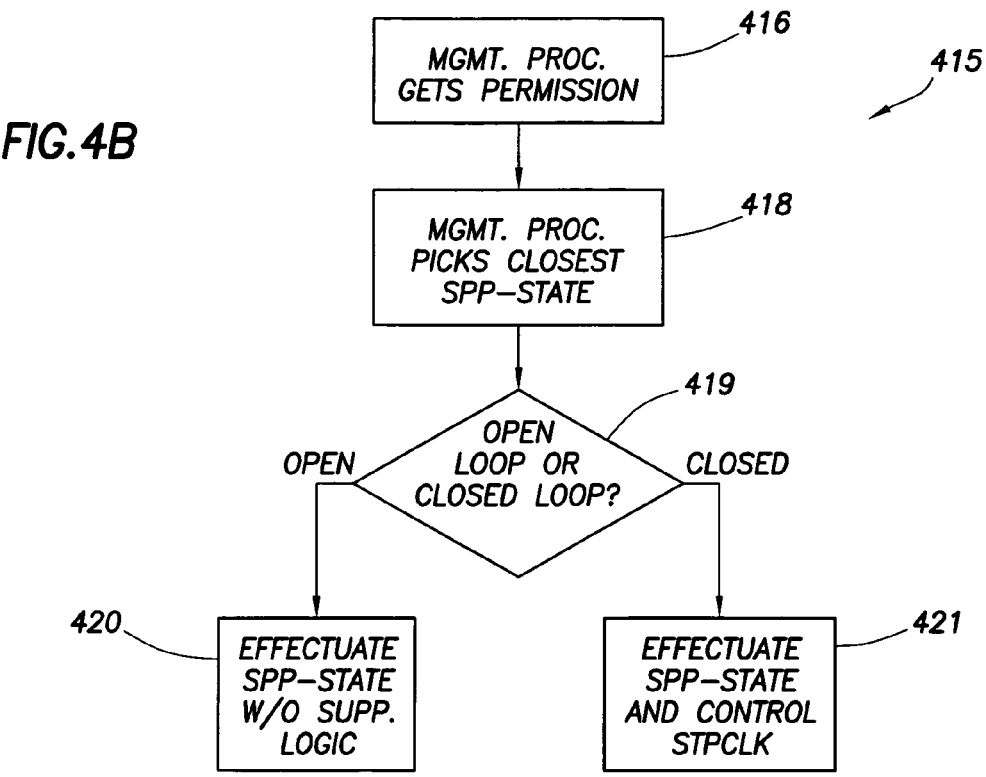
FIG. 4B shows an exemplary algorithm.

FIG. 4B illustrates an exemplary algorithm 415 that may be implemented by server 400 to adjust the SPP-state such that the power consumed by server 400 is within the power budget. In block 416, management processor 412 receives permission to power on server 400 from another management device higher up in the hierarchy (e.g., enclosure manager 111). Next, in block 418, management processor 412 selects the closest SPP-state that uses less power than the power budget that is assigned to server 400. The actual implementation of the SPP-state by server 412 varies based on whether the closed-loop or open-loop approaches are used as illustrated in block 419. In the open-loop approach, shown in block 420, management processor 412 may effectuate this SPP-state by setting the CPU STPCLK duty cycle without regard for the output of support logic 413. Conversely, in the closed-loop case of block 421, management processor 412 may write the power budget to register 411 and support logic 413 may control STPCLK based on comparisons made by comparison circuit 410. In both open-loop and closed-loop approaches, however, management processor 412 may set the CPU p-state and the parameters related to additional system components 408. Management processor 412 then may determine these parameters by consulting the internal lookup table 414 that reflects the actual power consumption that was produced by running maximum load tests on server 400. Since the value selected from internal lookup table 414 is based on actual work load requirements, rather than name plate power estimates, the power negotiated and subsequently budgeted for server 400 may be more accurately estimated. Thus, any over-estimation of power that would normally be present (because of name plate power estimates) may be allocated to other areas of the data center.

Determining Actual Power Dissipation for SPP-States

While the embodiments of the present invention shown in FIGS. 4A and 4B depict implementing SPP-states, some embodiments involve determining the values of the constituent portions of these SPP-states, such as p-state and STPCLK settings. These values are optimally chosen to provide maximum computational capability while throttling back power consumption of the CPU for each SPP-state. Since the actual power consumption is a function of the potential configurations of the server and the applications running on the server, however, determining the actual power dissipation for each SPP-state may be difficult.

Figure 5C:
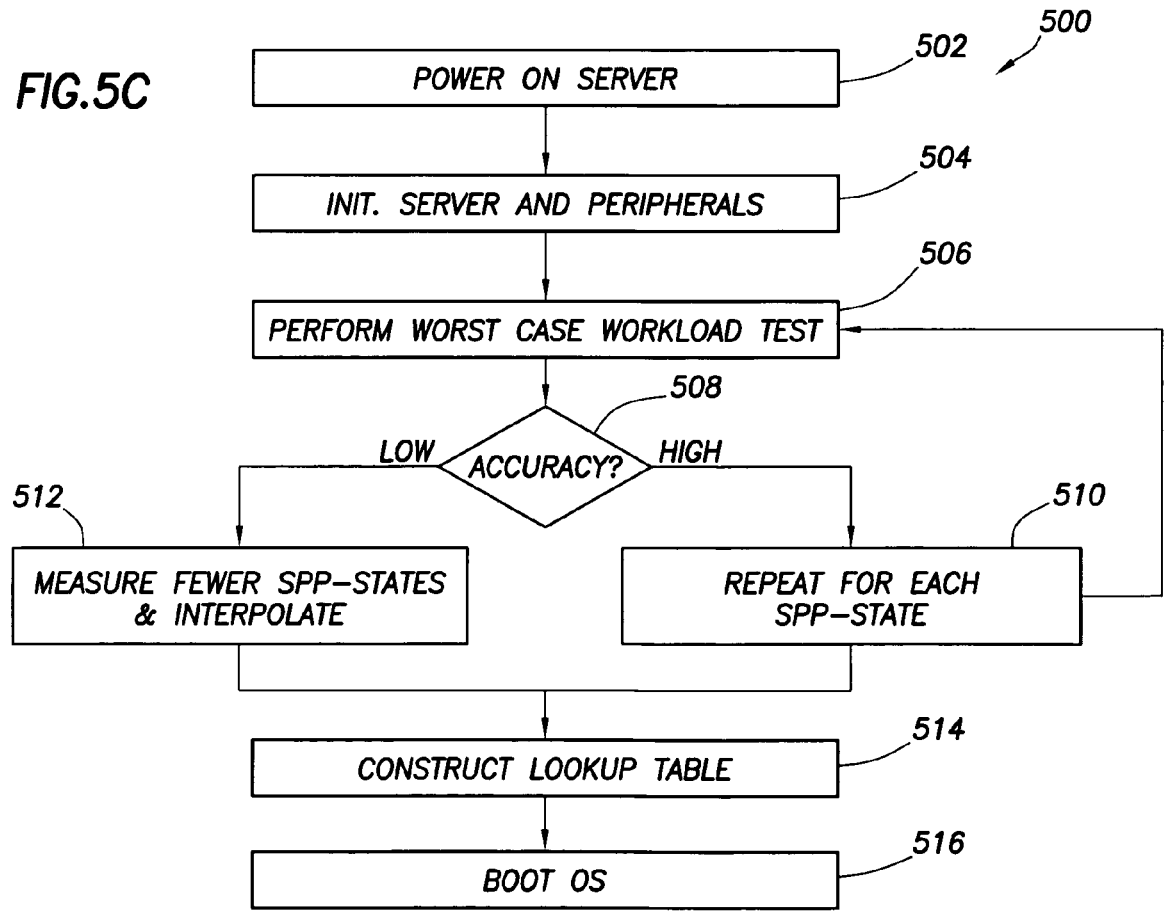
FIG. 5C shows an exemplary algorithm.
Figure 5A:
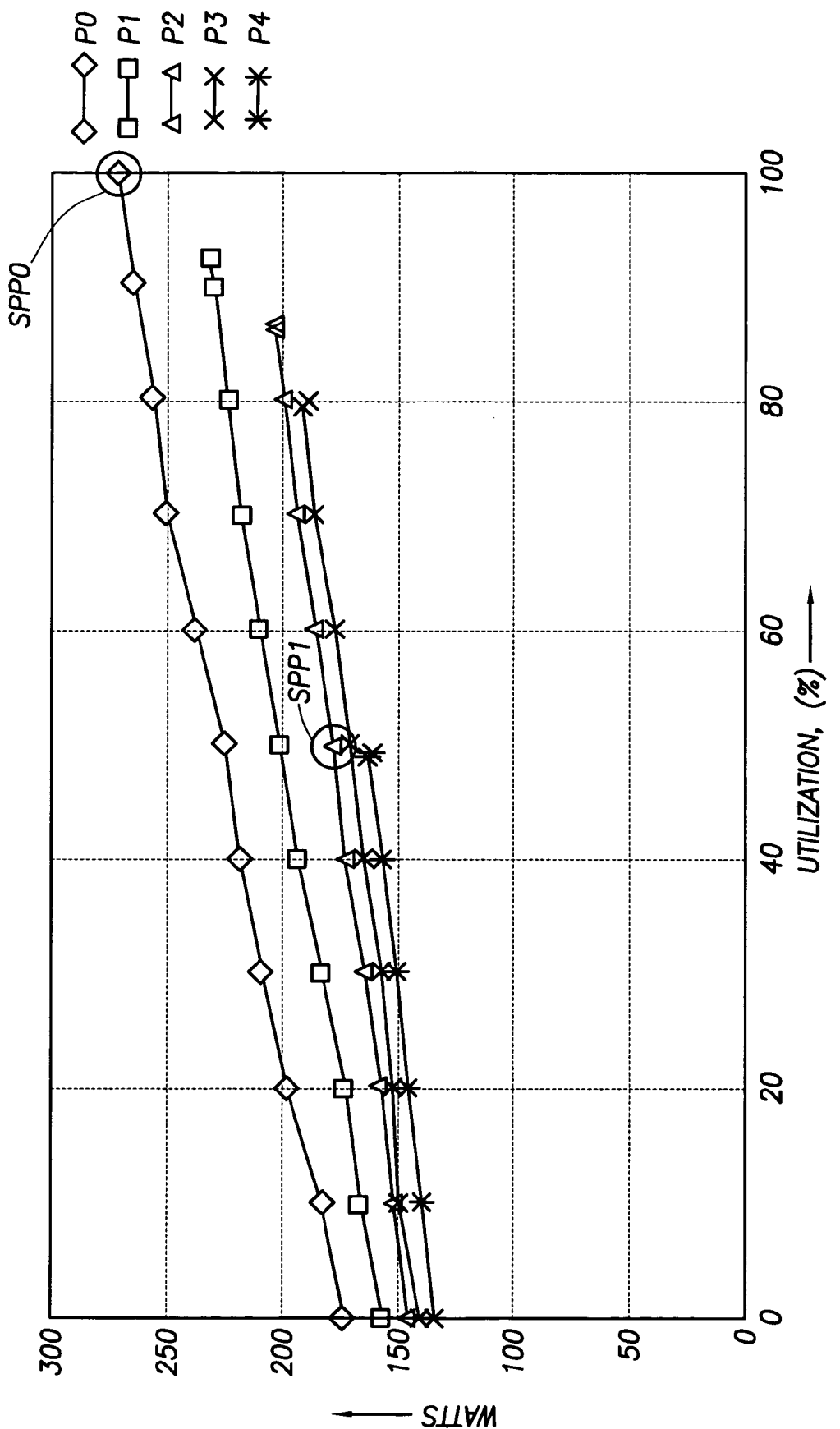
FIG. 5A shows an exemplary power consumption graph.
Figure 5B:
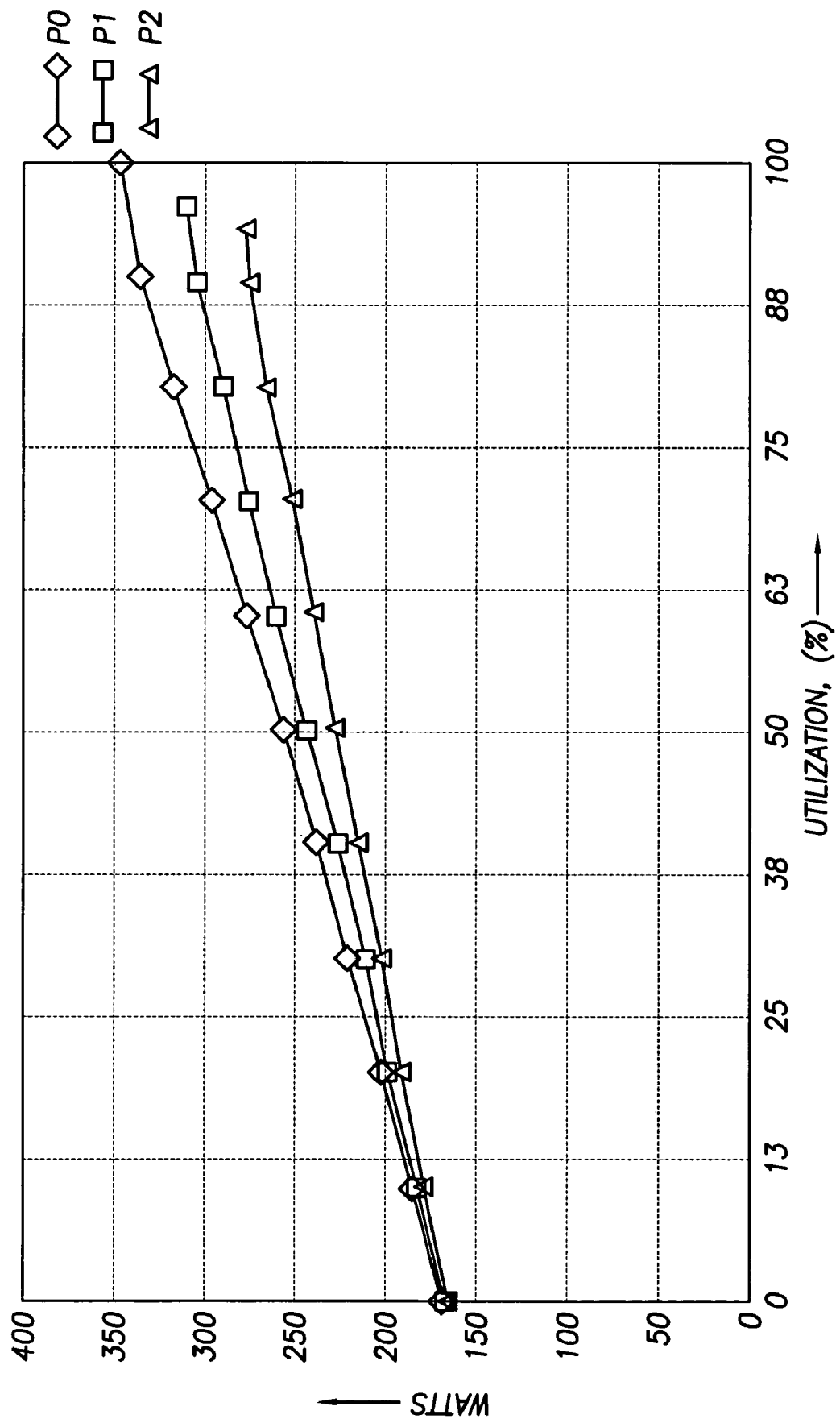
FIG. 5B shows another exemplary power consumption graph.

FIGS. 5A and 5B depict power consumption curves for the CPUs of two servers, the DL145 (represented in FIG. 5A) and the DL360 G4 (represented in FIG. 5B), both of which are available from Hewlett-Packard, Inc. Referring to FIGS. 5A and 5B, the power consumption, in Watts, is depicted on the ordinate axis while the utilization of the CPU is depicted on the abscissa axis (expressed as a percentage). This CPU utilization is determined at the various CPU p-states (where each p-state is represented with a different power consumption curve) by varying the work load of the CPU. These power consumption curves may be useful in determining desired power regulation values for the SPP-states because they represent actual measurements of the server being controlled rather than a generalized estimation of a particular type of server.

As shown in the legend, each curve in FIG. 5A represents a separate CPU p-state for the DL145. For example, FIG. 5A depicts p-states P0-P4, where the line with diamonds represents the P0 p-state, the line with squares represents the P1 p-state, the line with triangles represents the P2 p-state, the line with Xs represents the P3 p-state, and the line with asterisks represents the P4 p-state. Additional p-states are possible. FIG. 5B includes similar designations for p-states P0-P2 for the CPU of the DL360 G4.

Referring to FIGS. 5A and 5B, the SPP-states may be represented as points along each of the respective p-state curves. For example, with regard to the P0 p-state curve, each point along the curve (represented with a diamond) may indicate a different level of CPU utilization. These different CPU utilization points may also be obtained by running a high-utilization work load and asserting different duty cycles for STPCLK. In other words, the right-most point on the P0 p-state curve, which is marked by SPP0, represents the CPU in the P0 p-state with no STPCLK signal asserted, i.e., 100% utilized. This SPP0 state corresponds to about 275 W of power consumption. Similarly, the point on the P3 p-state curve marked as SPP1 represents the CPU in the P3 p-state with the CPU capped at about 44% utilization as a result of about a 50% duty cycle on the STPCLK connection. This SPP1 state corresponds to about 175 W of power consumption. Various SPP-states may correspond to different p-state and STPCLK settings, as well as to different settings of peripheral devices in the system (e.g., hard disk rotation speed).

FIG. 5C illustrates an exemplary algorithm 500 that may be implemented to determine an SPP-state based on actual measurements of the server being controlled. Algorithm 500 also may be used to determine SPP-states for other devices within data center 100, such as a network switch.

In block 502, the server is powered on and begins the power on self test (POST) procedure. In general, POST includes code that is executable by the server and is stored in a storage location, such as non-volatile storage 311. POST may include initializing the server as well as the server's peripherals per block 504. Once the initialization is complete, the server then performs a worst case synthetic work load test in block 506. During this synthetic work load test, non-volatile storage 311 may execute code that reads the actual power consumption as measured by measurement circuitry 404 (shown in FIG. 4A). This worst case work load test is performed in the SPP0 SPP-state (i.e., P0 p-state and no STPCLK) and then also may be calculated for the remaining SPP-states, if desired. Calculating SPP-states rather than only p-states may be advantageous from a power consumption perspective. Although the various p-states generally provide the most power savings with the least impact on performance, CPU manufacturers may only define a few p-states so only minimal power savings are available by toggling through the various p-states. Thus, by implementing SPP-states, where the power consumption is not only dependent on p-states but also may depend on STPCLK settings or power management of other subsystems, greater power savings is possible.

The values associated with each of these SPP-states may be entered into lookup table 414 (shown in FIG. 4A), and therefore may be available for later use during server operation.

Prior to constructing lookup table 414, the overall accuracy of algorithm 500 may be set in block 508. If the accuracy of algorithm 500 is set high, then the work load test of block 506 may be repeated for each defined SPP-state per block 510. Once each SPP-state is defined, the server proceeds to booting the operating system in block 516.

On the other hand, if the desired accuracy of algorithm 500 is set low, then algorithm 500 generates fewer points for lookup table 414 and management processor 412 interpolates between these points as illustrated in block 512. For example, in situations where it is unnecessary to calculate the SPP-state with high accuracy, then the code in non-volatile storage 311 may measure the worst case power at SPP0 and also measure the power consumed by the CPU in the P0 p-state while the CPU is idle, i.e., the minimum power consumption, and then management processor 412 may interpolate between these two by mathematical interpolation. With this interpolation complete, in block 514, algorithm 500 constructs lookup table 414. With lookup table 414 constructed, the server proceeds to booting the operating system as illustrated in block 516. In some embodiments, these SPP-states may be determined each time the server is initialized and prior to booting the operating system.

Adjustment of Power Levels during Operation

As discussed above, each server in the data center may be required to limit its power consumption to within a power budget value assigned by a management device higher up in the hierarchy. In the closed-loop embodiments of the present invention, this may be accomplished by choosing values for the constituent settings of the SPP-states. In these closed-loop embodiments, each SPP-state may be associated with constituent settings such as p-state, STPCLK, and the settings of additional system components 408. As discussed above in the context of FIGS. 5A-C, these constituent settings may be initially chosen prior to server operation based on actual measurements of the server in question, but are not changed during server operation because of closed-loop operation. However, since power consumption often depends not only on the percent utilization of the CPU but the actual sequence of instructions being executed, these values that were chosen prior to server operation using a preselected instruction sequence may need to be adjusted to further optimize power consumption for the user's actual instruction sequence.

Figure 6:
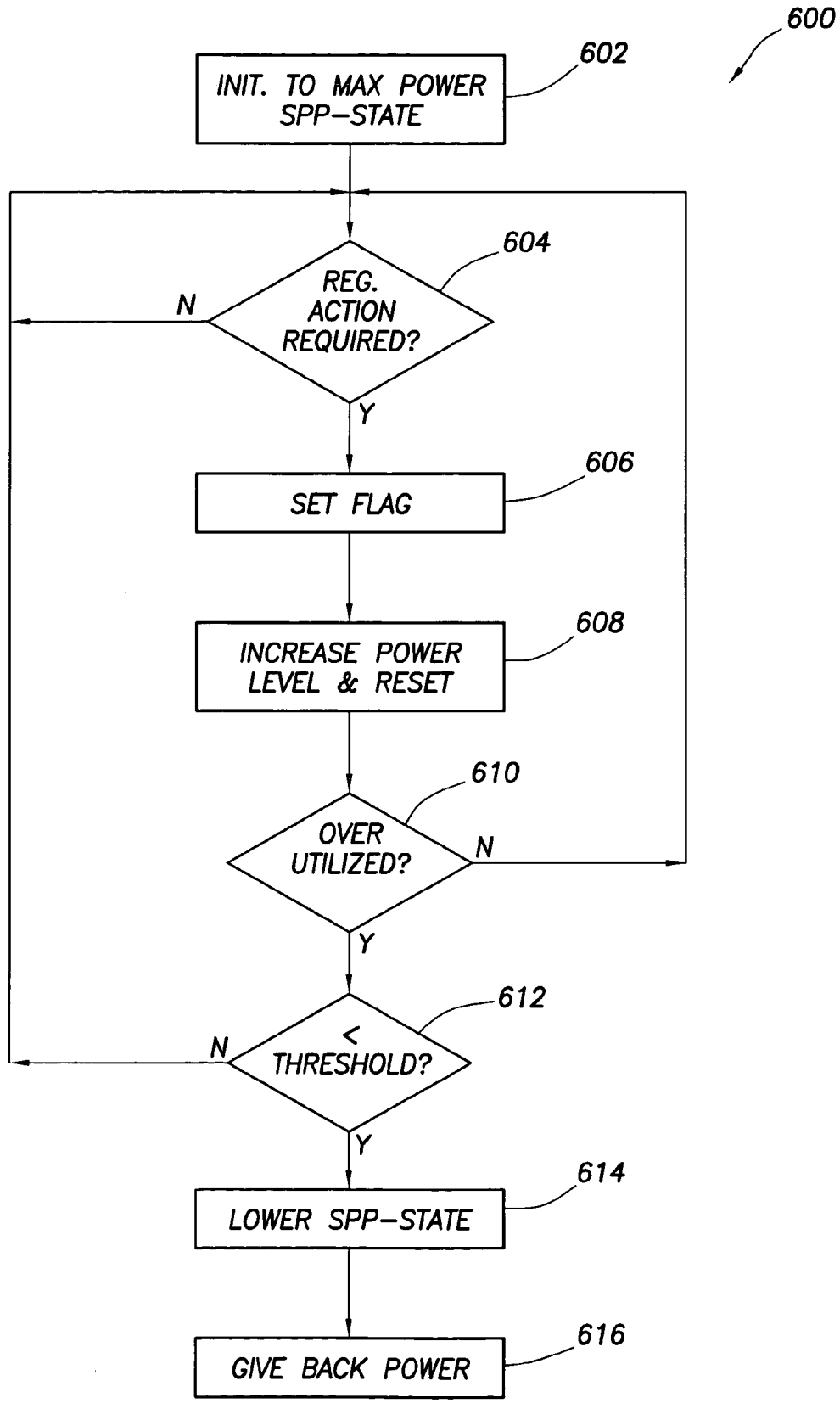
FIG. 6 shows an exemplary algorithm.

Accordingly, algorithm 600 illustrated in FIG. 6 may further optimize the power levels associated with these SPP-states during closed loop operation. Algorithm 600 may be stored in non-volatile storage 311 in some embodiments.

Referring now to FIG. 6, in block 602, the server (such as server 400 shown in FIG. 4A) may initialize itself to an SPP-state that represents the maximum power within a p-state. For example referring back to FIG. 5A, this may be the P1 p-state, which consumes about 240 Watts of power when the CPU is 100% utilized. Algorithm 600 then determines whether this value represents an optimum value for the user's actual instruction sequence.

While the server is operating at this initial power level, in block 604, it is determined whether power regulation action was required, during a closed loop operation, to keep server 400 from exceeding the power budget established by management processor 412. For example, the user's actual instruction sequence may consume more power than the preselected instruction sequence of the initial SPP-state. If no regulation was required to keep server 400 from exceeding the power budget, then block 604 repeats to continually monitor whether regulation action has been required. On the other hand, if power regulation was required to keep server 400 from exceeding the power budget, then this indicates that the server's operating conditions have changed such that the closed-loop settings may not represent the most optimum value, and a flag may be set per block 606. This flag may be implemented in hardware as a bit in a register of management processor 412 or alternatively this flag may be implemented in software.

Management processor 412 periodically checks this flag, and if set, increases the power level associated with the current SPP-state per block 608. This may occur through increasing the constituent settings of the SPP-state, such as the p-state. Along with increasing the power level associated with the SPP-state in block 608, management processor 412 resets the maximum power measurement of block 602.

Algorithm 600 then determines whether the CPU (such as CPUs 406 shown in FIG. 4A) is over-utilized or under-utilized, per block 610. If the CPU is under-utilized, then algorithm 600 loops back to block 604 to monitor whether regulation action is required. On the other hand, if the CPU is over-utilized, such as when the CPU is running close to 100% utilization, then algorithm 600 checks the maximum power reading for the current SPP-state per block 612. This maximum power reading may have been changed by block 608, or it may have remained the same from initialization in block 602. If this maximum power reading is less than the power at the current SPP-state by a predetermined threshold, then management processor 412 lowers the SPP-state per block 614. The amount that management processor 412 lowers the SPP-state by is variable, however, and in some embodiments this amount is set lower than the threshold value from block 612. Thus, in one embodiment the predetermined threshold for block 612 is 10%, and the management processor 412 may lower the regulation point power by 5% in block 614. While the SPP-state power is lowered, if the power is lowered to a level that is below the lowest p-state, then interpolation may be required between the measured maximum power for this minimum p-state with no modulation of the clock and the measured maximum power for this minimum p-state with modulation of the clock. Ultimately, in block 616, if the SPP-state changes such that the server is consuming less power, then the server may allow this power to be reallocated by other management devices (e.g., enclosure managers 111 or zone managers 107).

The above discussion is meant to be illustrative of the principles and various embodiments of the present invention. Numerous variations and modifications will become apparent to those skilled in the art once the above disclosure is fully appreciated. For example, although servers are mentioned throughout this disclosure other devices within a data center, such as switches and routers, also fall within the scope of this disclosure. In addition, while power thresholds may have been discussed in this disclosure, this disclosure also extends to energy thresholds that measure power consumption over time. In this manner, the disclosed embodiments may be regulated according to the amount of heat that they produce. It is intended that the following claims be interpreted to embrace all such variations and modifications.

What is claimed is:

1. A method for adjusting power consumption during server operation, the method comprising:

initializing the server to an initial system power performance state (SPP-state) that comprises a plurality of constituent power settings contained in a table;

modifying at least one of the plurality of constituent power settings stored in the table; and comparing a maximum power consumption threshold to a power consumption measurement at the initial SPP-state and reducing at least one of the plurality of constituent power settings associated with the initial SPP-state if the maximum power consumption threshold is less than the power consumption measurement at the initial SPP-state.

2. The method of claim 1, wherein the plurality of constituent power settings includes a p-state and clock modulation.

3. The method of claim 1, wherein the initial SPP-state is based on a predetermined maximum power rating of the server.

4. The method of claim 1, further comprising adjusting the maximum power consumption threshold of the server when modifying at least one of the plurality of constituent power settings.

5. The method of claim 1, wherein the amount that the at least one of the plurality of constituent power settings is reduced by is less than a predetermined threshold.

6. The method of claim 1, further comprising reallocating power reductions to at least one other server.

7. The method of claim 1, wherein the plurality of constituent power settings includes a p-state and power reduction of one or more server subsystems other than the CPU.

8. The method of claim 1, wherein the method is executed by a management processor.

9. The method of claim 1, wherein at least some of the method is executed by a zone manager.

10. A server comprising:
a central processing unit (CPU);
a management processor coupled to the CPU via a bus, wherein the management processor adjusts power consumption according to executable code, the code causes the management processor to:
initialize the server to an initial system power performance state (SPP-state) that comprises a plurality of constituent power settings contained in a table;
during a boot process, negotiate power consumption for the server with a management device external to the server; and
modify at least one of the plurality of constituent power settings stored in the table based on the negotiated power consumption for the server.

11. The server of claim 10, wherein the bus is a PCI bus.

12. The server of claim 10, wherein the initial SPP-state is based on a stored maximum power consumption measurement of the server and wherein the code further causes the management processor to adjust the stored maximum power consumption measurement of the server when at least one of the plurality of constituent power settings is increased.

13. The server of claim 12, wherein the code further further causes the management processor to compare the stored maximum power consumption measurement to the power consumption of the server at the current SPP-state and to change at least one power setting in the table for the current SPP-state if the stored maximum power consumption measurement is greater than the power consumption at the current SPP-state.

14. The server of claim 13, wherein changes to the power settings are by less than a predetermined threshold.

15. The server of claim 14, wherein the code further cause the management processor to reallocate power initially allocated to the server to at least one other server that is coupled to the management processor.

16. The server of claim 15, wherein at least some of the code is executed by a zone manager.

17. The server of claim 10, wherein the management processor further couples to a second management processor that controls the power consumption for at least one other server.

18. A server comprising:
a central processing unit (CPU);
a means for managing power within a server coupled to the CPU, the means for managing power performs a method comprising:
initializing the server to an initial system power performance state (SPP-state) that comprises CPU frequency and clock modulation settings contained in a table; and
comparing a maximum power consumption threshold to a real-time power consumption measurement for the initial SPP-state and reducing at least one of the CPU frequency and the clock modulation settings associated with the initial SPP-state if the maximum power consumption threshold is less than the real-time power consumption measurement for the initial SPP-state.

19. The server of claim 18, wherein the means for managing power further couples to an additional means for managing power that controls the power consumption for at least one other server.

* * * * *

UNITED STATES PATENT AND TRADEMARK OFFICE
CERTIFICATE OF CORRECTION

PATENT NO. : 7,607,030 B2  Page 1 of 1
APPLICATION NO. : 11/475765
DATED : October 20, 2009
INVENTOR(S) : Alan L. Goodrum et al.

It is certified that error appears in the above-identified patent and that said Letters Patent is hereby corrected as shown below:

In column 16, line 3, in Claim 13, after "the code further" delete "further".

Signed and Sealed this

Thirtieth Day of March, 2010

David J. Kappos
*Director of the United States Patent and Trademark Office*